(12) United States Patent
Hansen et al.

(10) Patent No.: US 10,204,055 B2
(45) Date of Patent: *Feb. 12, 2019

(54) SYSTEM AND METHODS FOR EXPANDABLY WIDE PROCESSOR INSTRUCTIONS

(71) Applicant: MicroUnity Systems Engineering, Inc., Santa Clara, CA (US)

(72) Inventors: Craig Hansen, Los Altos, CA (US); John Moussouris, San Francisco, CA (US); Alexia Massalin, San Jose, CA (US)

(73) Assignee: MicroUnity Systems Engineering, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,180

(22) Filed: Sep. 7, 2017

(65) Prior Publication Data

US 2018/0173635 A1 Jun. 21, 2018

Related U.S. Application Data

(63) Continuation of application No. 14/749,955, filed on Jun. 25, 2015, now Pat. No. 9,785,565.
(Continued)

(51) Int. Cl.
*G06F 12/08* (2016.01)
*G06F 9/30* (2018.01)
(Continued)

(52) U.S. Cl.
CPC ........ *G06F 12/0875* (2013.01); *G06F 9/3016* (2013.01); *G06F 9/30181* (2013.01);
(Continued)

(58) Field of Classification Search
None
See application file for complete search history.

(56) References Cited

U.S. PATENT DOCUMENTS 3,581,279 A 5/1971 Arbuckle
3,833,889 A 9/1974 Cray
(Continued)

FOREIGN PATENT DOCUMENTS

CN 1653446 8/2005
EP 212571 3/1987
(Continued)

OTHER PUBLICATIONS

U.S. Appl. No. 14/749,955, "First Action Interview Pilot Program Pre-Interview Communication", dated Mar. 9, 2017, 18 pages.
(Continued)

*Primary Examiner* — Eric Coleman
(74) *Attorney, Agent, or Firm* — Kilpatrick Townsend & Stockton LLP

(57) ABSTRACT

Expandably wide operations are disclosed in which operands wider than the data path between a processor and memory are used in executing instructions. The expandably wide operands reduce the influence of the characteristics of the associated processor in the design of functional units performing calculations, including the width of the register file, the processor clock rate, the exception subsystem of the processor, and the sequence of operations in loading and use of the operand in a wide cache memory.

21 Claims, 6 Drawing Sheets

Related U.S. Application Data

(60) Provisional application No. 62/019,101, filed on Jun. 30, 2014.

(51) Int. Cl.
  *G06F 12/0875* (2016.01)
  *G06F 9/34* (2018.01)
  *G06F 9/38* (2018.01)

(52) U.S. Cl.
  CPC ........... *G06F 9/30192* (2013.01); *G06F 9/34* (2013.01); *G06F 9/3824* (2013.01); *G06F 9/3895* (2013.01); *G06F 2212/452* (2013.01)

(56) References Cited

U.S. PATENT DOCUMENTS

| | | |
|---|---|---|
| 4,068,300 A | 1/1978 | Bachman |
| 4,251,875 A | 2/1981 | Marver et al. |
| 4,353,119 A | 10/1982 | Daniel et al. |
| 4,393,468 A | 7/1983 | New et al. |
| 4,658,349 A | 4/1987 | Tabata et al. |
| 4,658,908 A | 4/1987 | Hannukainen |
| 4,785,393 A | 11/1988 | Chu et al. |
| 4,823,259 A | 4/1989 | Aichelmann et al. |
| 4,930,106 A | 5/1990 | Danilenko et al. |
| 5,031,135 A | 7/1991 | Patel et al. |
| 5,170,399 A | 12/1992 | Cameron et al. |
| 5,185,861 A | 2/1993 | Valencia et al. |
| 5,280,598 A | 1/1994 | Osaki et al. |
| 5,283,886 A | 2/1994 | Nishii et al. |
| 5,325,493 A | 6/1994 | Herrell et al. |
| 5,333,280 A | 7/1994 | Ishikawa et al. |
| 5,375,215 A | 12/1994 | Hanawa et al. |
| 5,426,379 A | 6/1995 | Trimberger |
| 5,430,556 A | 7/1995 | Ito et al. |
| 5,471,593 A | 11/1995 | Branigin et al. |
| 5,481,686 A | 1/1996 | Dockser |
| 5,487,024 A | 1/1996 | Girardeau et al. |
| 5,509,137 A | 4/1996 | Itomitsu et al. |
| 5,535,225 A | 7/1996 | Mayhew et al. |
| 5,550,988 A | 8/1996 | Sarangdhar et al. |
| 5,551,005 A | 8/1996 | Sarangdhar et al. |
| 5,574,939 A | 11/1996 | Keckler et al. |
| 5,579,253 A | 11/1996 | Lee et al. |
| 5,598,362 A | 1/1997 | Adelman et al. |
| 5,600,814 A | 2/1997 | Gahan et al. |
| 5,604,864 A | 2/1997 | Noda |
| 5,636,363 A | 6/1997 | Bourekas et al. |
| 5,646,626 A | 7/1997 | Willis et al. |
| 5,669,012 A | 9/1997 | Shimizu et al. |
| 5,671,170 A | 9/1997 | Markstein et al. |
| 5,675,526 A | 10/1997 | Peleg et al. |
| 5,717,946 A | 2/1998 | Satou et al. |
| 5,721,892 A | 2/1998 | Peleg et al. |
| 5,740,093 A | 4/1998 | Sharangpani et al. |
| 5,742,840 A | 4/1998 | Moussouris et al. |
| 5,745,729 A | 4/1998 | Greenley et al. |
| 5,745,778 A | 4/1998 | Alfieri et al. |
| 5,752,001 A | 5/1998 | Dulong et al. |
| 5,752,264 A | 5/1998 | Blake et al. |
| 5,765,216 A | 6/1998 | Weng et al. |
| 5,768,546 A | 6/1998 | Kwon et al. |
| 5,778,412 A | 7/1998 | Gafken et al. |
| 5,799,165 A | 8/1998 | Favor et al. |
| 5,802,336 A | 9/1998 | Mittal et al. |
| 5,826,079 A | 10/1998 | Boland et al. |
| 5,826,081 A | 10/1998 | Zolnowsky et al. |
| 5,835,744 A | 11/1998 | Tran et al. |
| 5,835,782 A | 11/1998 | Lin et al. |
| 5,835,968 A | 11/1998 | Mahalingaiah et al. |
| 5,872,972 A | 2/1999 | Boland et al. |
| 5,889,983 A | 3/1999 | Mittal et al. |
| 5,933,627 A | 8/1999 | Parady |
| 5,933,650 A | 8/1999 | van Hook et al. |
| 5,935,240 A | 8/1999 | Mennemeier et al. |
| 5,940,859 A | 8/1999 | Bistry et al. |
| 5,991,531 A | 11/1999 | Song et al. |
| 5,999,959 A | 12/1999 | Weng et al. |
| 6,006,299 A | 12/1999 | Wang et al. |
| 6,038,675 A | 3/2000 | Gabzdyl et al. |
| 6,041,404 A | 3/2000 | Abdallah et al. |
| 6,058,408 A | 5/2000 | Fischer et al. |
| 6,061,780 A | 5/2000 | Shippy et al. |
| 6,105,053 A | 8/2000 | Kimmel et al. |
| 6,131,145 A | 10/2000 | Matsubara et al. |
| 6,134,635 A | 10/2000 | Reams et al. |
| 6,141,384 A | 10/2000 | Wittig et al. |
| 6,141,675 A | 10/2000 | Slavenburg et al. |
| 6,170,051 B1 | 1/2001 | Dowling |
| 6,211,892 B1 | 4/2001 | Huff et al. |
| 6,212,618 B1 | 4/2001 | Roussel et al. |
| 6,237,016 B1 | 5/2001 | Fischer et al. |
| 6,243,803 B1 | 6/2001 | Abdallah et al. |
| 6,260,135 B1 | 7/2001 | Yoshida |
| 6,263,428 B1 | 7/2001 | Nonomura et al. |
| 6,266,758 B1 | 7/2001 | van Hook et al. |
| 6,269,390 B1 | 7/2001 | Boland |
| 6,292,815 B1 | 9/2001 | Abdallah et al. |
| 6,292,879 B1 | 9/2001 | Fong |
| 6,295,599 B1 | 9/2001 | Hansen et al. |
| 6,317,824 B1 | 11/2001 | Thakkar et al. |
| 6,351,801 B1 | 2/2002 | Christie et al. |
| 6,370,559 B1 | 4/2002 | Hoffman et al. |
| 6,377,970 B1 | 4/2002 | Abdallah et al. |
| 6,378,060 B1 | 4/2002 | Moussouris et al. |
| 6,385,634 B1 | 5/2002 | Peleg et al. |
| 6,408,325 B1 | 6/2002 | Shaylor et al. |
| 6,418,529 B1 | 7/2002 | Roussel et al. |
| 6,426,746 B2 | 7/2002 | Hsieh et al. |
| 6,438,660 B1 | 8/2002 | Reams et al. |
| 6,453,368 B2 | 9/2002 | Yamamoto et al. |
| 6,463,525 B1 | 10/2002 | Prabhu et al. |
| 6,470,370 B2 | 10/2002 | Fischer et al. |
| 6,516,406 B1 | 2/2003 | Eitan et al. |
| 6,567,908 B1 | 5/2003 | Furuhashi et al. |
| 6,631,389 B2 | 10/2003 | Lin et al. |
| 6,633,897 B1 | 10/2003 | Peek et al. |
| 6,725,356 B2 | 4/2004 | Hansen et al. |
| 6,766,515 B1 | 7/2004 | Bitar et al. |
| 6,804,766 B1 | 10/2004 | Noel et al. |
| 8,269,784 B2 | 9/2012 | Hansen et al. |
| 9,582,281 B2 | 2/2017 | Kruecken |
| 2001/0021971 A1 | 9/2001 | Gibson et al. |
| 2009/0089540 A1 | 4/2009 | Hansen et al. |
| 2010/0325188 A1 | 12/2010 | Olson et al. |
| 2013/0173888 A1 | 7/2013 | Hansen et al. |
| 2013/0283019 A1 | 10/2013 | Ould-ahmed-vall et al. |
| 2015/0378734 A1 | 12/2015 | Hansen et al. |

FOREIGN PATENT DOCUMENTS

| | | |
|---|---|---|
| EP | 651514 | 5/1995 |
| EP | 800280 | 10/1997 |
| EP | 1024603 | 8/2000 |
| EP | 1102161 | 5/2001 |
| JP | 03098145 | 4/1991 |
| JP | 06149723 | 5/1994 |
| JP | 07114496 | 5/1995 |

OTHER PUBLICATIONS

U.S. Appl. No. 14/749,955, "Notice of Allowance", dated Jun. 13, 2017, 20 pages.
U.S. Control No. 95/000,100, "Office Action in inter partes Reexamination", dated Mar. 19, 2009.
U.S Control No. 95/000,100, "Right of Appeal Notice (37 CFR 1.953) in inter partes Reexamination", Jul. 11, 2009.
European Application No. EP10191073, "Extended European Search Report", dated Jan. 17, 2011.
European Application No. EP10191073, "Summons to Attend Oral Proceedings for European Patent Office Application", Dec. 4, 2012.
Gwennap, "UltraSparc Adds Multimedia Instructions", Microprocessor Report, vol. 8, No. 6, Dec. 5, 1994, pp. 1-3.

(56) References Cited

OTHER PUBLICATIONS

Hansen, "Architecture of a Broadband Mediaprocessor", Proceedings of Compcon, IEEE Computer Science, 1996, pp. 334-340.
Hansen, "MicroUnity's MediaProcessor architecture", IEEE Micro, vol. 16, No. 4, Aug. 1996, pp. 34-41.
Hendrix, "Viterbi Decoding Techniques for the TMS320C54x Family", Texas Instruments, Jan. 2002.
Lee et al., "An efficient recursive cell architecture of modified Euclid's algorithm for decoding Reed-Solomon codes", IEEE Transactions on Consumer Electronics, vol. 48, No. 4, Nov. 2002, pp. 845-849.
Lee, "High-speed VLSI architecture for parallel Reed-Solomon decoder", IEEE Transactions on Very Large Scale Integration (VLSI) Systems vol. 11, No. 2, Apr. 2003, pp. 288-294.
Leijten-Nowak et al., "An FPGA architecture with enhanced datapath functionality", Proceedings of the 2003 ACM/SIGDA eleventh international symposium on Field Programmable Gate Arrays, Feb. 2003, pp. 195-204.
International Application No. PCT/US2015/038078, "International Preliminary Report on Patentability", dated Jan. 12, 2017, 7 pages.
International Application No. PCT/US2015/038078, "International Search Report and Written Opinion", dated Sep. 29, 2015, 9 pages.
Rice, "Multiprecision division on an 8-bit processor", Proceedings of the 13th IEEE Symposium on Computer Arithmetic,, dated Jul. 1997, pp. 74-81.
Welch, "A fixed-point fast Fourier transform error analysis", IEEE Transactions on Audio and Electroacoustics, vol. 17, No. 2, Jun. 1969, pp. 151-157.
European Patent Application No. EP15815691.9, "Extended European Search Report Received", dated Nov. 27, 2017, 10 pages.
Chinese Patent Application No. 201580036141.1, "Office Action", dated Sep. 20, 2018, 12 pages.

SYSTEM AND METHODS FOR EXPANDABLY WIDE PROCESSOR INSTRUCTIONS

CROSS-REFERENCE TO RELATED APPLICATIONS

This application is a continuation of U.S. patent application Ser. No. 14/749,955, filed on Jun. 25, 2015; which claims priority from U.S. Provisional Patent Application No. 62/019,101, filed Jun. 30, 2014, and entitled, "Processor Architecture and Methods for Expandably Wide Operations with Improved Efficiency". Each of these references is hereby incorporated in its entirety for all purposes.

BACKGROUND OF THE INVENTION

This invention is related to computer processors, and in particular to computer processors having operands substantially wider than the data path width between the processor and memory.

We have previously described a programmable processor and method for improving the performance of programmable processors by enabling the use of operands that are larger than the internal data path width of the processor. See, e.g. U.S. Pat. No. 8,269,784 entitled "Processor Architecture for Executing Wide Transform Slice Instructions," which is incorporated by reference herein. This prior invention uses the contents of general-purpose registers to specify operands stored in memory that are wider than the processor internal data path. The operands are typically a multiple of times wider than the data path and are preferably stored in adjacent rows of a memory. The registers also specify the memory address at which the plurality of widths of data can be read (or written).

FIG. 1, taken from our earlier patent, illustrates a sample FFT slice instruction with 5 fields 'wminor,' '*data,' '*twiddl,' 'fftpar,' and 'wfftslic'. The instruction causes the processor to perform an operation that when repeated a sufficient number of times computes a Fast Fourier Transform (FFT). Each time the instruction is executed a 'slice' of the FFT is computed. The register field *data specifies an address for a region in memory containing data and the register field *twiddl specifies an address for another region in memory containing "twiddle factor" coefficients (complex roots of unity).

The first time this operation is executed, twiddle factors are loaded at the rate of the available processor memory bus into a "coefficient RAM" embedded in the execution unit (or, in an alternative embodiment, are already present in embedded ROM), and data are loaded into embedded "wide cache" memories. Successive operations reuse the twiddle factors to perform successive slices of FFT on data buffered in the embedded cache.

The exemplary hardware for performing this operation is also shown in FIG. 1. The hardware in FIG. 1 contains 16 complex multipliers and 4 radix-4 "butterfly/mux strips," capable, for example, of performing a single slice of a 256-point radix-4 complex FFT in 16 cycles. The register field fftpar ("FFT parameters") specifies a processor register specifying the size and shape of the data and twiddle operands, the nature of the FFT slice performed, along with status information, such as a scaling or shift amount needed to avoid overflow during execution of the next FFT slice. Four successive WFFTSLICE operations compute an entire 256-point complex FFT in 64 cycles, depositing the result in a memory-mapped wide cache.

The invention described below provides additional functionality to enable expandably wide operations with improved efficiency on a broader range of algorithms than our prior technology.

BRIEF SUMMARY OF THE INVENTION

The expandably wide operations disclosed here reduce the influence of the characteristics of the associated processor in the design of functional units performing the calculations, including (1) the width of the register file or files, (2) the clock rate of the processor, (3) the exception and interruption subsystem of the processor, and (4) the sequence of operations involving loading the wide cache operand and using the contents of the wide cache, e.g. streaming of operands and chaining of operations.

Further, the specification of expandably wide operations is designed such that the degree of parallelism by which the functional unit executes these operations can be varied from implementation to implementation without changing the definition of the instruction itself or the software employing these instructions. As such, a later implementation may use a functional unit with greater parallelism than the initial implementation without requiring alterations to the software designed for the initial implementation. In an alternative embodiment, functional units with a variable degree of parallelism may control the degree of parallelism to achieve active power and performance goals, again, without the need to change the application software. Such a functional unit with variable parallelism may vary the degree of parallelism by optionally powering-down (removing active power from) a portion of the functional unit and associated wide operand memory blocks.

In one embodiment a processor for executing instructions requiring expandably wide operands executes instructions that include an operation code field defining an operation to be performed by the processor in which the operation requires an operand which is wider than the data path between the processor and memory. The instruction also includes a data input field specifying an address of a data input region in a memory containing data to be input for the operation to be performed, and a function field specifying an address for a function region in the memory containing information about the function to be performed by the processor. The instruction also specifies a state field which can be used to store information about the state of execution of the instruction, e.g. if execution is interrupted. At least one of the operation code field, the data input field, and the function field provides an address in the memory for a block of data required by the operation to be performed, which block of data is wider than the widest data path between the processor and the memory.

In another embodiment, a processor for executing instructions requiring expandably wide operands includes a operation code field defining an operation to be performed by the processor, the operation requiring an operand which is wider than a widest data path between the processor and the memory. A field in the expandably wide instruction specifies an address of a block of data in the memory. The data in the block of data include a descriptor field that specifies within that block, locations of at least input data to be used in the operation to be performed by the processor, and function data to be used in performing the operation on the input data. At least one of the input data and the function data is wider than the widest data path between the processor and the memory. If desired locations for state data and output data within the memory block can also be included within the descriptor field.

Other objects, features, and advantages of the present invention will become apparent upon consideration of the following detailed description and the accompanying drawings, in which like reference designations represent like features throughout the figures.

DETAILED DESCRIPTION OF THE PREFERRED EMBODIMENTS

Figure 1:
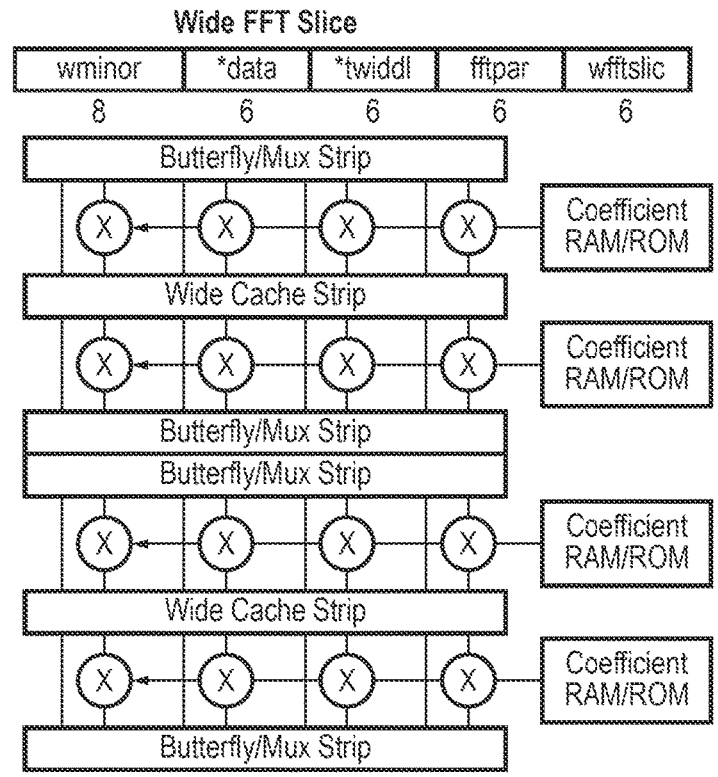
FIG. 1 is a prior art diagram from U.S. Pat. No. 8,269,784.
Figure 2:
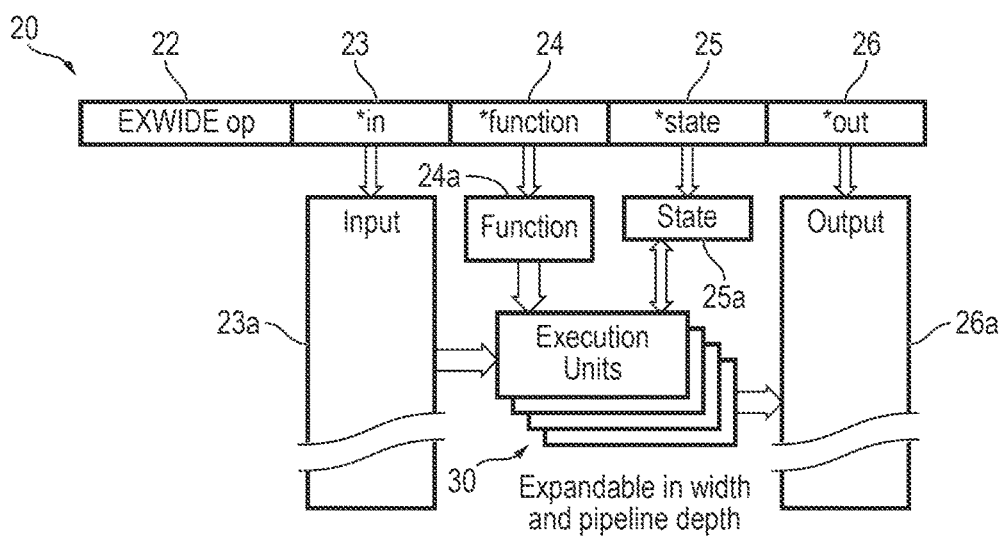
FIG. 2 is a diagram of an expandably wide instruction and the fields within that instruction.

This invention enables expandably wide operations in which instructions and operands substantially wider than a processor-memory data path can be used by a processor. The processor may be a main processor in a computer system, or it may be one of a plurality of processors within a computer system that share a single memory system in a directly connected or distributed fashion. In FIG. 2 an expandably wide instruction 20 is shown. This exemplary embodiment shows a 32-bit instruction having five fields, but the invention can be applied to instructions of other fixed, or even variable lengths.

The instruction uses a plurality of fields 22-26. Field 22 provides an operation code ('opcode'). Examples of the operations implemented by the instruction are described below in conjunction with Table 1, and elsewhere. The other register fields 23, 24, 25, and 26 specify registers whose content provides addresses, which addresses can be virtual or real addresses, to the processor's memory system for the instruction operands described below. The memory system referenced here may be a processor's main memory system or one of a plurality of a processor's memory systems, e.g. a cache memory. This memory system, in various alternative embodiments, can include instruction caches and/or data caches, in various hierarchies to achieve memory density and average access time performance goals.

In the expandably wide instruction, fields *in 23 and *out 26 specify addresses for a location in memory containing data to be input to the execution unit(s) 30 and a location for storing resulting output data from the execution unit(s) 30. (As notation herein, the asterisk '*' is indicative of the declaration of an address variable in the C language.) The register field *function 24 specifies an address in memory which provides the function implemented by the instruction. The register field *state 25 specifies an address containing a description of the state of the operation. For example, in an exemplary embodiment of an expandably wide fast Fourier transform (EXWIDEFFT) operation, the function region contains the twiddle factor coefficients and/or a description of the type and manner in which the FFT is computed, such as specification of radix 2, radix 4, split radix 2/4, radix 8 or other butterfly schemes, and/or description of the precision, shifting, rounding and overflow strategies to perform. In this instruction, the state region contains control and status information, such as a specification of the intermediate progress of an ongoing FFT at the time that such an operation may be interrupted, as by a count of how many butterfly computations have been performed, or approximate values of the largest value encountered so far, for purposes of optimizing rounding and scaling of the intermediate FFT computation. The address of the memory region provided by the field is illustrated below the corresponding field by a block of memory, e.g. the *in field 23 provides the address of memory block 23a, the *out field the address of memory block 26a, etc.

In an alternative embodiment, a single *in/out field (rather than separate fields *in and *out) may specify a memory block used for both input and output. In addition, a single *function field may specify a memory block used for both function and status purposes. One or more of these fields may be duplicated, as when an instruction may have multiple input operands, or may be omitted. For example the *state field may be omitted if the instruction operation is short enough that it is not important if the operation may be interrupted. Another use of the state region 25a is to contain state information indicating that an operation may only be partially completed, as when such an instruction is interrupted to handle exception conditions arising within the instruction itself or arising from conditions from another source, such as an I/O event. Re-executing an instruction with state in this condition enables continuing the operation where it left off, enabling finishing the operation as if it was never interrupted. The memory block addressed by *state can be of arbitrary size, or absent, depending on the particular instruction. The *function field may be omitted if no further function specification is required beyond the one or more operation code fields of the instruction.

FIG. 2 illustrates how the information from the various regions of memory is used. The data 23a addressed by the *in field is used as an input to the one or more execution units 30, which execute the functions on that data as specified by the *function information 24a. The results are provided as output to the *out memory block 26a. The state region 25a may be used to provide both input and output operands for the instruction, or to preserve an intermediate state of the operation. Because this state information is specified by a memory address, rather than contained within a general-purpose register, it can contain additional information beyond the limitations imposed by the register width of the processor. Moreover, long delays in updating this state (e.g. more than 100 cycles) can be accommodated by existing mechanisms for handling latencies in the memory hierarchy, without complicating the pipeline control, register bypass, and exception handling logic of the processor data paths.

In an exemplary embodiment, the address of the memory block is used to control a transfer of memory data between the processor's memory system and these relatively smaller memory blocks indicated as 23a, 24a, 25a, and 26a. By managing these memory blocks as a cached copy of data in the processor's memory system, an initial execution of the instruction initiates copying of data into the memory blocks prior to, or at nearly the same time, as the initial execution of the instruction's operation. Subsequent executions of the same instruction or other instructions using the same memory address may be started without repeating the copying of the data, so long as the copy is still valid. Processor writes or writes initiated by other processors or other devices within the computer system may be tracked so that these writes cause the memory blocks to be kept up to date with respect to these operations, or in an alternative embodiment, to be marked as not valid or no longer valid, so that a subsequent instruction execution recopies the processor's memory data.

Cache coherency states commonly designated as M, O, E, S, I, or similar coherency schemes are employed by the exemplary embodiment in labeling these memory blocks (or portions of the memory blocks) to reduce the number of times data must be copied between the processor's memory system and these memory blocks. The physical design of these memory blocks is intended to accept such transfers at a rate governed by the design of the processor's memory system, while accesses by the functional unit may be at a substantially higher bandwidth, allowing the functional unit to perform at a greater bandwidth than if these operands were transferred directly from the processor's memory system.

Figure 3:
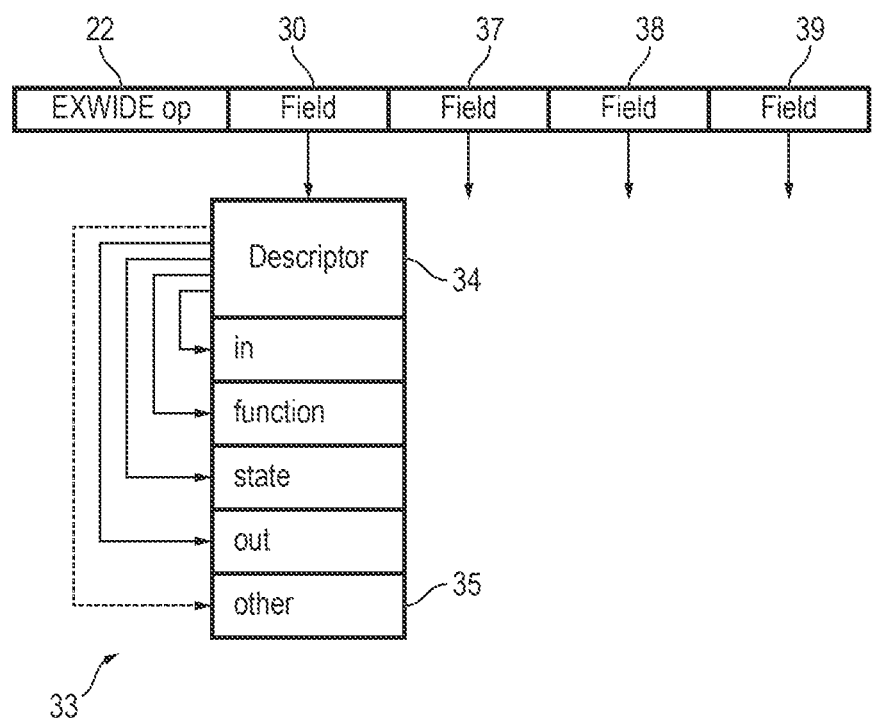
FIG. 3 is a diagram of an expandably wide instruction using a descriptor block.

FIG. 3 illustrates an embodiment of an expandably wide instruction in which a field 30 in the instruction provides the address of a block of memory 33 storing more information than just one of the *in, *function, *state, and *out data. Block 33 itself contains a descriptor field 34 which provides offsets to regions within block 33 that contain one or more of the *in, *function, *state, and *out data. The block can also contain "other" information as needed for any particular function. The use of the descriptor field and the offsets provides an advantage of enabling different sizes (or even no size) for the various fields. To obtain efficiency benefits, one or more of these regions may be aligned to convenient boundary and/or contain unused padding regions between defined regions. Another advantage of the use of blocks and the descriptor field is the flexibility it allows in instruction specification. The descriptor field can provide an offset to, for example, the function field 35 where additional portions of the instruction specification are provided, enabling the opcode 22 to have arbitrary length, and for different instructions to have different effective lengths. In effect, the opcode itself can be considered an expandably wide operand.

In one embodiment, block 33 is a contiguous block of memory that contains the information from the separate fields. In alternative embodiments, the block can also contain virtual addresses or offsets to different areas of memory, or even different memories, that provide the needed values for the execution units 30 to implement the operation specified. The flexibility of the approach allows for future expansion, e.g. by adding information to the descriptor 34 to provide an offset to other areas of memory. The "other" field 36 indicates this. In an alternative embodiment, a small memory block or dedicated registers are designed to contain the descriptor information, and physically separate memory blocks, designed with appropriate bandwidth to the functional unit are employed to contain the *in, *out *function and *state data, to be filled via the cache coherent copying methods described herein. In this manner, the physical design continues to resemble that of FIG. 2.

While memory block 33 preferably contains all of the information for the *in, *function, *state and *out, if one or more of those fields is not needed for a particular instruction, it need not be included within the block. Thus instead of using separate regions of memory 23a, 24a, 25a, and 26a as shown in FIG. 2, one region of memory 33 contains the necessary information for appropriate ones of the fields *in, *function, *state, and *out.

Figure 7:
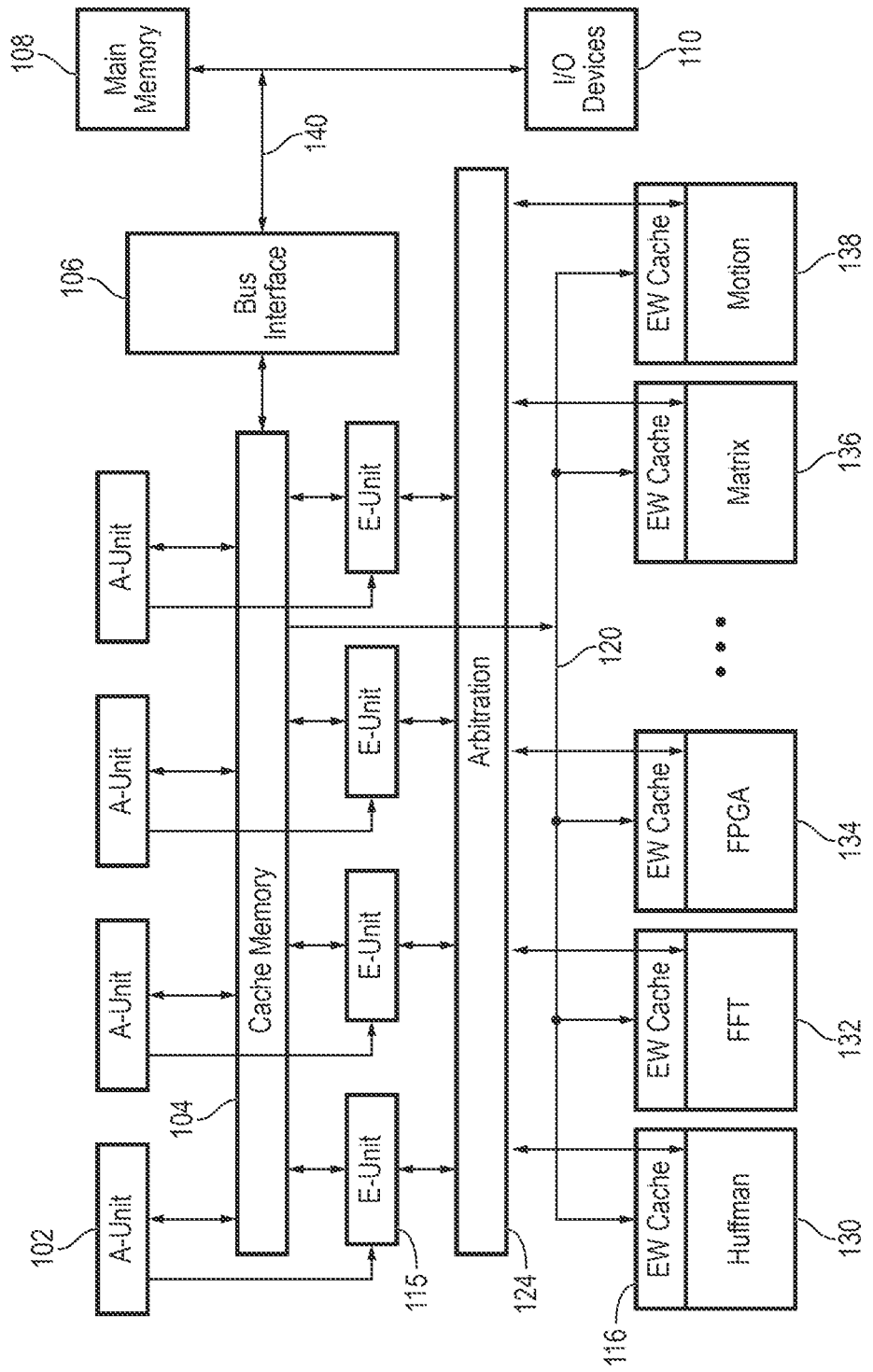
FIG. 7 is a diagram of one embodiment of the architecture of a processor for executing expandably wide operations.

Once the location(s) in memory for the one or more fields *in, *function, *state and *out are identified, operand data from the processor's memory system is loaded into a cached memory block near or associated with the relevant execution unit of the processor. This cached memory block is sufficiently large to store the widest operand the processor can use in its execution units, and is not limited to the access bandwidth of the processor's memory system. Once the information is in the cache, the execution unit of processor can then retrieve (or store) the necessary *in, *function, *state and *out data for that operation. The wide cache memory is indicated in FIG. 2 by the rectangles 23a, 24a, 25a and 26a to which the arrows from the instruction fields point. Exemplary hardware for implementing such functionality is shown in FIG. 7, discussed below.

Because the data to be transferred to or from the memory is substantially 'wider' than the data paths between the processor and memory, multiple cycles are used to move that data between the processor and memory. For example if the processor-memory data path is 128 bits wide, then moving an operand of 2048 bits requires 16 transfers over the processor-memory data path to place the 2048 bit operand in the cache memory associated with the functional unit used for execution of that operation.

The use of memory blocks with descriptors is not limited to just one memory block per instruction. As shown in FIG. 3 other fields 37, 38, and 39 in the instruction can provide addresses to other memory blocks, each optionally having its own descriptor. In other words, one or more fields may specify more memory blocks, and each memory block may contain a descriptor that designates one or more included memory blocks. Thus, in alternative embodiments, similar instructions may be encoded with as little as one field specifying a single memory block, or may have a plurality of fields, each specifying various memory blocks. The use of the descriptor permits a single instruction field to specify a plurality of subset memory blocks, each of one of the types *in, *out *function, or *state. In an exemplary embodiment, the use of a descriptor for one or more the memory blocks is optional, as controlled by a bit or designated code in the instruction opcode field(s), or alternatively, as controlled by a bit or designated code within the address specified by the one or more instruction fields.

For example, when the memory block is designated by an address that is aligned to a power-of-2 size, there will be one or more zero bits at the least-significant end of the address. Using this property, by adding one-half of the power-of-2 size of the memory block, the address can encode both an address and further specify a size of the memory block. By limiting the minimum size of the memory block to a specified size, one can ensure that there are one or more least significant address bits that will be zero. For example, if the minimum size of the expandably wide operand is four bytes, after adding one-half of the memory block size (in this case 2) to the address, the combined address and size will have a least significant bit that is zero. For example, setting the least significant bit can specify the presence of a descriptor. If the least significant bit is cleared, then the descriptor can be considered as absent. Alternatively, this convention can be reversed, so that the least significant bit is set to specify no descriptor and cleared to specify a descriptor. The contents of the descriptor field will generally contain offsets and sizes within the memory block at which the individual sub-memory blocks are themselves contained. These offsets and sizes may be specified as items of a certain number of bytes each, leaving the remainder of the memory block available for the various sub-memory blocks.

In an alternative embodiment, the overall size of the memory block, including the sub-blocks, may be encoded in a fixed field within the memory block itself, so that the overall size is not limited to a power of two as described above. Sub-block sizes may be designated by adding one-half of the size to the offset field, providing a compact representation, but requiring sub-block alignment and power-of-2 sub-block sizes, or alternatively the sub-block sizes and offsets may be separately specified items, removing limitations of alignment and sizes of the sub-blocks. To avoid security implications of specifying offsets that are larger than the overall size of the memory block, offsets and sizes may trigger an exception if they are impermissibly large. Alternatively, the offsets and sizes may be masked by a bit-field comprising a value of the overall size minus one (a value that has one bits in each location where a one bit is permissible, and a zero bit in each location where a one bit is impermissible). This avoids a reference to a sub-block that is not within the overall block.

Figure 4:
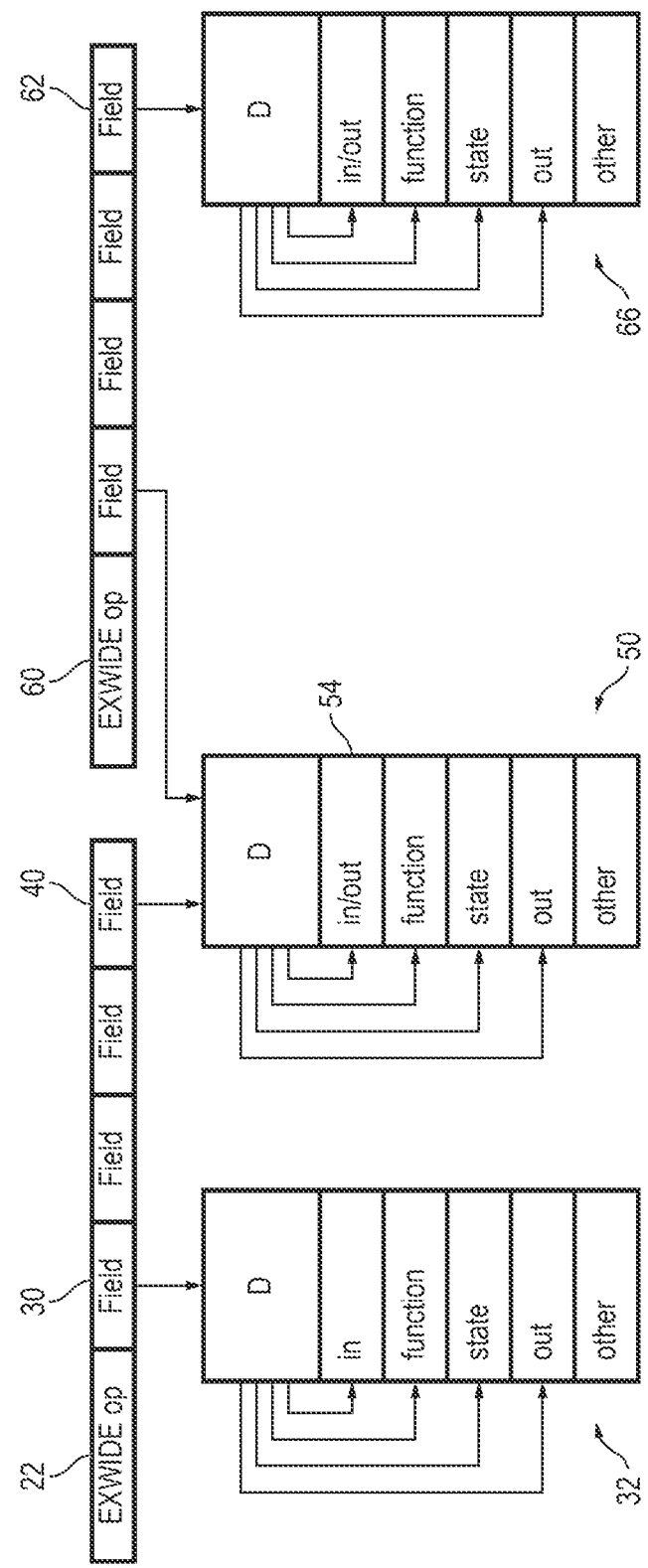
FIG. 4 is a diagram illustrating chaining of expandably wide instructions using descriptor blocks.

FIG. 4 illustrates a further use of the descriptors to chain together multiple expandably wide instructions. In FIG. 4, a first expandably wide instruction includes an opcode 22 and a field 30 that provides an address of a block of memory 32. Another field 40 in the instruction provides the address of another block of memory 50. The descriptor field within block 32 provides offsets for the various fields within the block, and similar descriptor fields within block 50 provide offsets from the operation 22. Thus the output data from operation 22 can be used as input data for the subsequent instruction implementing operation 60. This ability to chain expandably wide instructions in the manner illustrated provides flexibility to perform complex operations in a simpler manner than prior art approaches. For example, a EXWIDE-FFT operation, performing a forward transform, may be chained to a EXWIDE-MATRIX-MULTIPLY, multiplying the transformed value by transformed filter coefficients, which may in turn be chained to an EX-WIDE-FFT operation, performing an inverse transform, to perform a digital filter operation.

Figure 5:
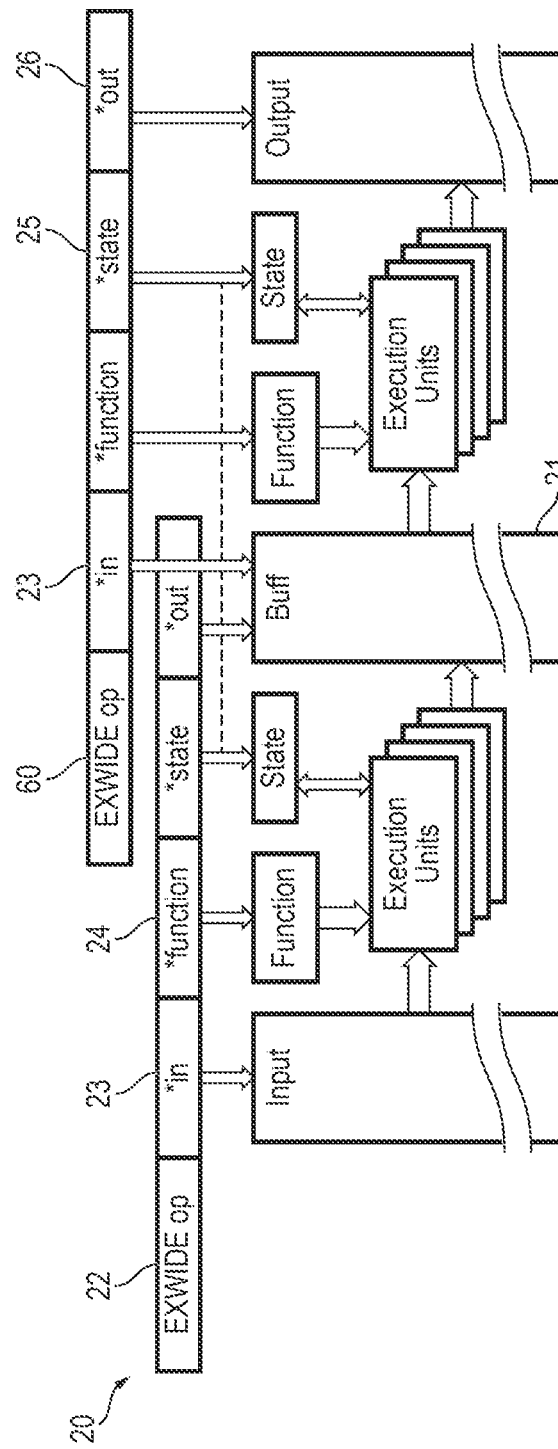
FIG. 5 is a diagram illustrating chaining of expandably wide instructions using fields.

FIG. 5 illustrates chaining multiple expandably wide instructions in which the instruction fields themselves provide addresses of the op code 22, *in 23, *function 24 *state 25 and *out data. Note how the *out address of the first instruction 20 designates a buffer 21 where the resulting output data is used as input data for the operation 60 of the second instruction.

Table 1 below lists some exemplary instructions using expandably wide operands.

TABLE 1

Exemplary Expandably Wide Operations

| Expandably Wide Operation | *function |
| --- | --- |
| EXWIDENEURALNET | description of a many-layered neural network |
| EXWIDEEXTRACT | shift amount, precision, rounding parameters |
| EXWIDEFFT | radix of butterflies (radix 2, radix 4, split radix 2/4, radix 8), rounding and precision controls, twiddle factor coefficients |
| EXWIDEFILTER | coefficients of an FIR or IIR filter |
| EXWIDEFPGA | configuration data of field programmable gate array |
| EXWIDEGATHER | list or specification of offsets to gather inputs |
| EXWIDEHASH | parameters and, initial values to input to hash algorithm |
| EXWIDEHUFFMAN | tables of translation symbols and lengths |
| EXWIDEMATRIX: (Matrix-add, Matrix multiply, Matrix multiply-add, Matrix multiply-subtract, Matrix inverse) | dimensions, data type and precision of operands, sub-operation field may designate details of operations, such as multiply, multiply-add, multiply-subtract or matrix invert |
| EXWIDEMOTIONEST | range of offsets to search for best estimate of motion |
| EXWIDERAKE | parameters for rake filter |
| EXWIDERESHAPE | parameters for transposing or reshaping an array |
| EXWIDESCATTER | list or specification of offsets to scatter output |
| EXWIDESHAPE | new matrix dimensions to apply to input data |

The approach described in FIGS. 2, 3, 4 and 5 enable execution of numerous operations using expandably wide instructions and/or operands. The table above lists some of exemplary expandably wide operations. These include EXWIDEMATRIX (in which the function region contains the matrix elements multiplied by the input vector or matrix to produce the output vector or matrix); EXWIDEFILTER (function contains coefficients of an FIR or IIR filter); EXWIDEMOTIONEST (function contains range of offsets to search for best estimate of motion); EXWIDERAKE (function contains parameters for rake filter); EWIDE-HUFFMAN (function contains tables of translation symbols and lengths); EXWIDEHASH (function contains parameters and, initial values to input to hash algorithm; EXWID-ENEURALNET (function contains description of a many-layered neural network); and EXWIDEFPGA (function contains configuration data of field programmable gate array).

Other expandably wide instructions can include instructions which implement scatter or gather functions. For example, operations invoked by EXWIDESCATTER or EXWIDEGATHER can scatter data to, or gather data from, a list of addresses specified by the function region. In addition, EXWIDE instructions can be implemented that convert input and/or output data from one type to another, e.g. from fixed point to floating point, or vice versa, as well as between desired precisions or sizes.

In each case, the state region describes the size and shape of the input, output and function operands, and the details of the operation to be performed, including internal state and status of progress. As mentioned above, in some operations not all of the *in, *out, *function, and *state parameters are necessary. For example, for an EWIDE-MATRIX-MULTI-PLY instruction, there may be separate *in parameters for each of the two matrices or vectors to be multiplied, while the *function parameter may be omitted. The *in parameters may contain descriptors that specify the size and shape of the matrix operand and precision of the operands. Alternatively, the *function parameter may specify among other things, that a matrix multiplication is to be performed, rather than other matrix operations, as well as the precision of the operands and the shape of the matrices to multiply.

In earlier patents, for example, our prior patent cited above, we described a wide operand specifier to enable retrieval of the wide operand from memory. The specifier there contains a pointer to a power-of-two aligned region of memory, together with additional information that specifies the size and/or shape of the wide operand. The additional information is encoded into the low-order bits that are assured to be zero due to the alignment. As described above, additional low-order bits that can be assured to be otherwise zero by specifying the minimum size of the operand may also be deployed to, for example, specify whether a descriptor block is present for the wide operand.

The expandably wide operand field described here is more flexible, using additional formats, as well as different formats for the wide operand itself, providing additional options in operand size and shape. For example, the wide operand descriptor here may point to a region of memory that has reduced requirements for alignment, or no particular alignment at all. In such a case, there may be smaller set of low-order bits that may contain additional information, such as size and shape of the operand. This may occur, for example, if there is a plurality of wide operands, and the size and/or shape of one wide operand can be inferred from the size and/or shape of other wide operands, such as when a filter vector or matrix, in an aligned wide operand, is convolved against a not-aligned wide operand.

Additionally, information may be contained within the memory region that further delineates the portion of the wide operand containing relevant operands. For example, in various alternative embodiments, a descriptor block within the wide operand memory region may contain a starting offset and ending offset, or a starting offset and a length, or a length and an ending offset. The lengths and offsets may be measured in bytes, multiples of the element size, or otherwise. The descriptor block may be contained at a fixed offset, such as the beginning of the specified memory region, or at the end of the specified memory region, or may be located by an offset or length itself indicated at a fixed offset. By embedding the descriptor block within the memory region specified by the expandably wide operand descriptor, a wide operand source or destination is no longer limited to a power-of-two overall size.

In various alternative embodiments, e.g. as illustrated in FIG. 3, the additional size and/or shape information that would otherwise have been specified in the register field is located within the descriptor block 32. In other embodiments, the operand size specification may also be located within the descriptor block. In specifying the size and shape of the operand, the information may be represented as a power-of-two value in the form of a base-two-logarithm, or such a value with an additional offset (as when the size is expressed as an overall size in bytes as opposed to the number of elements). Alternatively, any of the size, shape or operand size values may be expressed as a simple binary number of bytes, bits, or number of elements.

The shape data can identify a row or column size of a two-dimensional array of elements, and may be generalized to specification of the number of dimensions, not limited to two, but may be one, two, three, or any maximum number of dimensions, with the size in bytes, bits, or elements in each of the dimensions. In an alternative embodiment, dimensions may be implied by knowledge of the overall size of the relevant expandably wide operand, or the overall size may be inferred from the knowledge of the size of each dimension of the array.

Furthermore, the relevant operand may use only a portion of the expandably wide operand memory region. The remaining region may contain additional buffer space that the processor may write into to prepare the region for operations following, e.g. an EXWIDE instruction, without disrupting the operation of the EXWIDE instruction itself. For example, the EWIDEHUFFMAN instruction may decode a stream starting at a specified offset, and continuing until the result operand space is exhausted, the input stream is exhausted, or the operation is otherwise terminated.

A further benefit of this invention is that the processor may perform write operations that append additional symbols to the input stream without disrupting an operating instruction, e.g. an EWIDEHUFFMAN instruction. For example, the input stream can be represented as a circular buffer with offset values in the descriptor block marking the bounds of the circular buffer. Writing to the descriptor block in such a way as to add valid symbols to the input stream allows the EWIDEHUFFMAN to continue beyond the bounds that would have stopped it if the descriptor block of the input stream had not been changed. Similarly, in an alternative embodiment, writing to the descriptor block to remove output symbols from the result operand and thereby free-up space in the result operand may allow the EWIDEHUFFMAN to continue beyond the bounds that it would have stopped if the descriptor block of the input stream had not been changed. In addition, the descriptor block of both the input stream and of the output stream can be updated by the EXWIDEHUFFMAN instruction to represent the extent to which the input stream has been consumed, and the output stream has been filled at the completion of the instruction. Alternatively, the descriptor block may be updated at intermediate stages to permit simultaneous filling of the input stream or emptying of the output stream as the instruction progresses. In an alternative embodiment, the descriptor block of the input and/or output stream, or the descriptor block of a separate "*state" memory region controls the frequency of such intermediate updates. The EWIDEHUFFMAN instruction illustrates how other similarly stream-operating instructions can be employed.

By specifying these dimensions, sizes and element sizes in the descriptor block, the information within the expandably wide operand becomes essentially self-describing, so that this information no longer need be specified by the instruction, whether specified in the instruction itself, or within the value of register(s) specified by the instruction. Also, the values of dimensions, sizes and element sizes may imply the values of dimensions, sizes and element sizes of the result operand. The instruction using a wide operand may write these values into the memory region of the result operand, or in an alternative embodiment, may write these values into a descriptor region, or a region representing function or state.

In an alternative embodiment of an expandably wide instruction, e.g. the EWIDEHUFFMAN instruction, as a first cache coherence maintenance strategy, the descriptor blocks for the input and/or output streams are maintained in a cache coherence state that is exclusive to the functional unit while the functional unit is performing the instruction. If a processor, either the processor that initiated the instruction, or any other processor or I/O device attempts to read the descriptor block, the functional unit can provide a copy that reflects the current intermediate state of processing the input and output streams. Alternatively, an element of the descriptor block may indicate whether the functional unit is or is not actively processing the stream, or in other words, whether the instruction has completed. Reads of the output stream or writes to the input stream of values that the newly updated descriptor block indicates would be valid can proceed safely once the relevant descriptor block had been read.

Furthermore as an alternative cache coherence maintenance strategy, the handling of the descriptor blocks with respect to the cache coherence system is to suspend, block or delay reads of any portion of an output stream that may be changed by the instruction until a final value can be established. Reads of the output stream of portions of the output memory space for which the final values are present can proceed normally. Writes to the input stream are only permitted to the region of the input stream not actively in use by the instruction. In this manner, the architectural state of the memory is maintained, yet some operations to the input and output wide operands can proceed in parallel with the operation of the instruction. In other words, the state of the wide operands in memory is maintained as if the instruction is completed all at once, with none of the intermediate state visible. Nevertheless, after initiating such an operation, results from a previous operation can be read from the output stream, and new values for a subsequent invocation of the instruction can be written into the input stream, all while the operation is in progress. It is only when the descriptors are touched, that operations are serialized to maintain values as if the operation was performed all at once.

Programmers can choose appropriate cache coherence maintenance strategies, e.g., by a control field in one or more of the instructions, a register referenced by the instruction, or an input or output descriptor or the *function or *state wide operands. This approach can also be used in other operations that proceed in a highly serial fashion, for example, finite impulse response (FIR) and infinite impulse response (IIR) filters.

When multiplying matrices, mathematical convention is that the matrices are combined by a sum of products along specified dimensions of the left and right operand arrays, often a final dimension of the left and an initial dimension the right. It is also common, however, that matrices that are multiplied may need to be transposed or in some other way, reshaped to accommodate such convention. For example, the EXWIDEMATRIX instruction may include in the descriptor block of either operand, or a register operand or within the instruction, information that leads to an effective transposition or reshaping of the arrays to be multiplied, as they are multiplied. As another example, an EXWIDEMATRIX-MULTIPLY may be configured to transpose the left operand before combining the operands in a conventional matrix multiplication. Alternatively, the EXWIDEMATRIX instruction may specify dimensions of either or both of the left and/or right operand arrays to combine with a sum of products that may be different than the mathematical convention—this may have a similar effect to transposing either or both of the left and/or right operand arrays.

Another example of an expandably wide instruction is an EXWIDERESHAPE instruction that transposes or otherwise reshapes an array operand, copying the source operand data into a new result operand, or placing the result operand in place of the source operand into the same memory region. A separate EXWIDEEXTRACT instruction extracts a smaller elements size result from a wide operand using parameters specified by a parameter register or parameters specified in a wide operand or a descriptor block of a wide operand. The functions of the EXWIDERESHAPE instruction may be combined with the EXWIDEEXTRACT instruction to both transpose, or otherwise reshape an array operand, and extract elements from the source array. In an alternative embodiment, the functions of either or both of the EXWIDERESHAPE instruction and the EXWIDEEXTRACT instruction may be combined with other EXWIDE instructions, such as EXWIDEMATRIX-MULTIPLY, EXWIDEMATRIX-MULTIPLY-ADD or EXWIDEMATRIX-ADD.

The dimension, size, shape and/or element size parameters can be specified by a descriptor written into the result expandably wide operand prior to execution of the EXWIDE instruction that fills in the values. In such an embodiment, the prior value of the descriptor block influences the operation so as to produce values consistent with the parameter values. If desired, the descriptor block can control the operation of transposing or otherwise reshaping, extracting, or combining along a specified array dimension with a sum of products. Some of the descriptor block values influence the operand, while others are forced to values consistent with the input operands so as to produce a valid result.

The descriptor block values written by an EXWIDE instruction make the result self-describing, in that the combination of the descriptor block and the data that the descriptor block describes are collected together into a single expandably wide memory block that can be treated as a self-contained and self-described data structure. In addition, the value of the entire expandably wide operand memory region may be directly used as the source of a second EXWIDE instruction. In an alternative embodiment, operation of an EXWIDE instruction preferentially proceeds to fill in the descriptor block of the result operand as early as possible, but at least prior to completion of production of all the result values. This allows a second EXWIDE instruction that uses the prior wide operand result as a wide operand source to proceed and begin to make computational progress prior to completion of the first EXWIDE instruction. In an alternative embodiment, the use of MOESI or similar cache-coherence protocols are employed to allow the second operation to obtain the wide operand source values in a controlled manner.

Because of decoupling from register-related complications, an EXWIDEFFT operation can be extended to more powerful blocks of FFT computation—such as an entire 256-point complex FFT (rather than just a single slice), or a 1024-point or 4096-point FFT. These same EXWIDEFFT operations can be performed on implementations that scale down to a single multiplier, or up to the 16-multiplier or a 64-multiplier design or to larger designs capable to as much as an entire FFT stage or even the entire FFT at once. At large scale, multipliers may incorporate fixed twiddle factor values, so that multipliers may be implemented as multiply-by-constant hardware rather than a more general and generally larger two-operand multiplier. In an alternative embodiment, the same operation may be performed in a function unit that contains as little as a single integer multiplier-adder, to minimize power expenditure while maintaining compatibility with embodiments with large amount of parallelism.

One important advantage of expandably wide operations is that the size and shape of source and result operands can differ to accommodate greater precision in calculations. For example, in EXWIDEMATRIX the result operands could be double, or even quadruple, size compared to the source operands, and the source operands do not have to be same size, e.g. multiplying an 8 bit matrix by a 16 bit matrix can have a 32 bit result with no rounding and no overflows.

The EXWIDEMATRIX instruction may be implemented as a EXWIDEMATRIX-MULTIPLY instruction, which performs matrix-vector or matrix-matrix multiplication, using size and shape parameters taken from the wide operand descriptors or the *function or *state parameters, and using precision and rounding parameters specified from the *function or "*state parameters or from a sub-field of the instruction. In an alternative embodiment, the EXWIDEMATRIX instruction may be implemented as separate EXWIDEMATRIX-MULTIPLY-MATRIX-VECTOR and EXWIDEMATRIX-MULTIPLY-MATRIX-MATRIX instructions for the matrix-vector and matrix-matrix cases. In another alternative embodiment, the EXWIDEMATRIX instruction may be implemented as an EXWIDEMATRIX-MULTIPLY-VEC- TOR-VECTOR instruction that performs element-by-element vector multiplication, or the EXWIDEMATRIX instruction may be implemented as an EXWIDEMATRIX-ADD instruction, performing matrix-to-matrix addition or vector-to-vector addition using similar parameters as the EXWIDEMATRIX-MULTIPLY.

In further embodiments, the EXWIDEMATRIX instruction may be implemented as a EXWIDEMATRIX-MULTIPLY-ADD instruction, combining the matrix-vector or matrix-matrix multiplication with a matrix-to-matrix addition in a single instruction, without possibility of losing intermediate precision or range between the multiplication and addition operations. Still further, the EXWIDEMATRIX instruction may be implemented as a EXWIDEMATRIX-MULTIPLY-SUM instruction that performs a multiply-sum operation, combining an element-by-element multiplication with a horizontal summation of all the products, or detailed as an instruction that performs a combination of the above cases in a single instruction, using register or ex-wide-operand parameters to distinguish the cases.

The memory regions addressed by an EXWIDE operation are transferred into wide caches embedded in the corresponding EXWIDE execution unit. The input and output caches benefit when there is a high degree of locality: that is, once a single data item in a cache line is touched, the other items will be touched as well. The function and state caches benefit from a high degree of reuse: that is, once function and state data are fetched from the memory hierarchy into cache they are reused many times. Typical caches comprise single or dual ported memory cells (or even ROM cells, as in the case of FFT roots of unity, so called twiddle factors), and the number of cache entries needed are modest (e.g., 1-8 entries), so area and power dissipation are lower than multi-ported register file access would be for the same operand bandwidth.

Expandably wide operation hardware can approach the low area and power of ASICs, while streamlining integration with a general-purpose host processor. For example, an EWIDEHUFFMAN execution unit can have a narrow (e.g., 32-bit integer or smaller) data path specialized for Huffman decoding, with power gated off when idle. By issuing a single EWIDEHUFFMAN instruction, the host processor launches coding of a long stream (e.g. thousands) of symbols within the Huffman unit autonomously, while the host proceeds with other instructions. The host can query Huffman status by reading the state memory region or a memory-mapped event register. Alternatively, the event register can have an associated memory-mapped mask that enables interrupts to signal the host.

A multiplicity of execution units can implement a particular expandably wide operation. For example for server applications that require high (de)compression performance, multiple small serial Huffman units could each be initiated, each with a single EWIDEHUFFMAN instruction, and then be capable of independently processing multiple long streams of symbols in parallel.

Expandably wide execution units can operate asynchronously at a different clock rate than the host processor, using the same mechanisms that accommodate asynchrony in the memory hierarchy. For example, an EXWIDEFILTER execution unit can perform an IIR or FIR filter on data deposited into a circular buffer region of memory at a clock rate synchronized to an external mixed-signal interface, to provide a precise real-time feedback signal for reliable locking of the interface.

Figure 6:
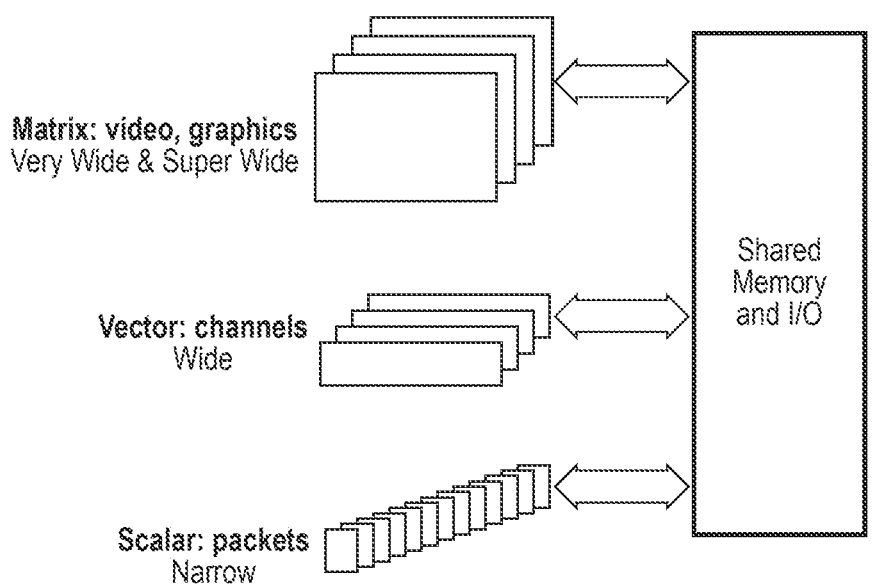
FIG. 6 illustrates that a single instruction set of expandably wide operations can execute correctly on processors with cores of different widths.

FIG. 6 illustrates how a large system on a chip may contain many cores, ranging from narrow low-power cores (suited, for example, for scalar processing of packet streams) to medium wide cores (suited, for example, for vector processing of 4G radio or audio channels) to extremely wide cores (suited, for example, for matrix processing of HDvideo and 3D graphics). A single instruction set of expandably wide operations executes correctly on cores of an extremely broad range of widths. Therefore the hypervisor of the host operating system can allocate tasks to cores of the best width to optimize performance and power dissipation. Application developers can tailor this allocation in advance. Alternatively, core monitoring hardware can be employed to maintain a database of performance statistics (for example, execution unit utilization, cache misses, etc.) utilized by the hypervisor to allocate tasks dynamically for optimal performance and power, even when app developers are lacking the information or resources to anticipate core allocation in advance.

FIG. 7 illustrates a general-purpose processor in block diagram form as an example of a processor that may be used to execute the expandably wide instructions described above. In the figure, four copies of an access unit (labeled "A-Unit") 102 are shown. Each access unit 102 includes an access instruction fetch queue coupled to a register file and functional units (not shown). In a typical embodiment, each thread of the processor may have on the order of sixty-four general-purpose registers. The access units function independently for four simultaneous threads of execution, and each compute program control flow by performing arithmetic and branch instructions and access memory by performing load and store instructions. These access units 102 provide wide operand descriptors for the expandably wide operand instructions discussed above. In FIG. 7, the memory system includes a cache memory 104, an external bus interface 106, and a main memory system 108 with I/O devices 110. Additional cache memory, e.g. a secondary cache, can also be provided if desired. The access units 102 produce results for access register files and provide memory addresses to the shared memory system 104, 106, and 108. The memory hierarchy can include on-chip instruction and data memories, instruction and data caches, a virtual memory facility, and interfaces to external devices.

The memory contents fetched from the memory system are combined with execute instructions not performed by the access units, and entered into four execute instruction units (labeled "E-Unit") 105. For expandably wide instructions, memory contents fetched from the memory system are also provided to the expandably wide operand caches 116 by bus 120. Within the E-Units 115, instructions and memory data are presented to execution register files that fetch execution register file source operands. The instructions are coupled to the arbitration unit 124 that selects which instructions from the four threads are to be routed to the available execution functional units 130, 132, 134, 136, and 138. Each execution functional unit includes a cache memory 116 for holding an expandably wide operand. The execution functional units 130-138 are arithmetic and logic units that are optimized to perform the various operations using the expandably wide operands. For example, the matrix execution functional unit is a unit designed to perform operations on matrices. A field in the opcode can specify the execution functional unit used for a particular instruction.

The execution functional units 130-138 each contain dedicated storage 116 to permit storage of source operands, including the expandably wide operands discussed above. These cache memories typically have a width that is a multiple of the width of data path 140 between the processor and memory. Thus, if the width of the data path 140 is 128 bits, the dedicated storage 116 preferably has a width which is a multiple of that 128 but width, e.g., a width of 256, 512, 1024 or 2048 bits. Of course depending on the particular function to be performed and the data associated therewith, some operands will utilize the full width of the dedicated storage, while others will not. As mentioned above, transfer of these expandably wide operands from the memory 108 to the storage 116 associated with the individual functional units will require multiple cycles in which portions of expandably wide operands are loaded sequentially into the dedicated storage 116. Once loaded, however, the expandably wide operands may then be used at substantially the same time.

This description of the invention has been presented for the purposes of illustration and description. It is not intended to be exhaustive or to limit the invention to the precise form described, and many modifications and variations are possible in light of the teaching above. The embodiments were chosen and described to explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for executing instructions requiring operands stored in a memory coupled to a processor by a data path having a width, the method comprising:
executing a first expandably wide instruction comprising:
a first operation code field at least partially defining a first operation, the first operation requiring a first operand; and
a first address field in the first expandably wide instruction specifying a first address of a first block of data in the memory, the first block of data in the memory including a first descriptor field that specifies within that first block, locations of both (i) first input data including the first operand to be used in the operation, and (ii) first function parameters to be used in further defining the operation on the first operand, wherein the first function parameters are wider than the width of the data path.

2. A method as in claim 1, further comprising:
executing the first operation; and
prior to completing execution of the first operation, performing a plurality of transfers between the memory and the processor to transfer the first block of data to a cache memory associated with the processor.

3. A method as in claim 1 wherein the first descriptor field further specifies within the first block of data a location of a first output field to be used for storing first output data from the first operation, and the method further comprises:
performing a plurality of transfers between the processor and the memory to transfer the first output data to the memory.

4. A method as in claim 1 wherein the first descriptor field further specifies within that first block of data a location of a first state field to be used for storing first state data from the first operation, the first state data enabling operations to be interrupted and later restarted from where interrupted.

5. A method as in claim 1 wherein the first expandably wide instruction comprises a matrix instruction specifying an arithmetic operation to be performed on at least one matrix, and the first function parameters include at least dimensions of each of the at least one matrix.

6. A method as in claim 1 wherein the first expandably wide instruction comprises a Huffman instruction specifying a decoding operation and the first function parameters include at least information describing translation symbols.

7. A method as in claim 1 wherein the first expandably wide instruction comprises a fast Fourier transform instruction specifying a transform operation and the first function parameters include at least information describing a radix of butterfly operations.

8. A method as in claim 1 wherein the first expandably wide instruction comprises a scatter instruction specifying a data handling operation for distributing data, and the first function parameters include at least information describing offsets of locations to which the data is to be scattered.

9. A method as in claim 1 wherein the first expandably wide instruction comprises a gather instruction specifying a data handling operation for gathering data and the first function parameters include at least information describing offsets of locations from which the data is to be gathered.

10. A method as in claim 3 further comprising:
executing a second expandably wide instruction comprising:
a second operation code field at least partially defining a second operation, the second operation requiring a second operand; and
a second address field in the second expandably wide instruction specifying a second address of a second block of data in the memory, the second block of data in the memory including a second descriptor field that specifies within that second block, locations of both (i) second input data including the second operand to be used in the operation, and (ii) second function parameters to be used in further defining the operation on the second input data, wherein at least one of the second input data and the second function parameters are wider than the data path and the second input data includes at least some of the first output data.

11. A method as in claim 1 wherein the first descriptor field includes at least one of:
a starting offset and an ending offset for the first input data;
a starting offset and a length for the first input data; and
the length and an ending offset for the first input data.

12. A method as in claim 1 wherein the first operation code field includes a bit indicating the presence or absence of the first descriptor field.

13. A method as in claim 1 wherein the first operation code field includes information specifying an execution unit to be used in performing the first operation.

14. A method as in claim 1 wherein the first block of data includes information describing contents of the first block of data.

15. A method as in claim 2 wherein the first descriptor field specifies the location of the first input data to be used in the first operation by specifying at least an offset between the address of the first block of data in the memory and a location in that first block of data where the first operand is stored.

16. A method as in claim 15 wherein the first descriptor field specifies the location of the first function parameters to be used in performing the first operation by specifying at least an offset between the address of the first block of data in the memory and a location in that first block of data where the first function parameters are stored.

17. A method for executing instructions requiring operands stored in a memory coupled to the processor by a data path having a width, the method comprising:
executing a first expandably wide instruction comprising:

a first operation code field partially defining a first operation, the first operation requiring a first operand;

a first data input field specifying an address of a first data input region in the memory containing at least a first operand;

a first function field specifying an address for a first function portion of the memory containing parameters to be used in performing the first operation, the first function portion being wider than the data path width and requiring multiple transfers to be copied from the memory for use by the processor; and a state field specifying an address for a state region in the memory for storing state information describing an intermediate state of the first operation to thereby allow the first operation to be interrupted and restarted.

18. A method as in claim 17 wherein the state information is wider than the data path and storing the state information in the memory requires multiple transfers to copy the state information from the processor to the memory.

19. A method as in claim 18 further comprising:

executing a second expandably wide instruction comprising:

a second operation code field partially defining a second operation;

a second data input field specifying an address in a memory for a second data input region containing a second operand to be used in the second operation; and a second function field specifying an address in the memory for a second function region containing second function parameters to be used in the second operation, wherein at least one of the second function region and the second data input region require multiple transfers across the data path to be copied from the memory.

20. A method as in claim 17 wherein the first operation code field includes information specifying an execution unit to be used in performing the first operation.

21. A method for executing instructions requiring operands stored in a memory coupled to the processor by a data path having a width, the method comprising:

executing an expandably wide instruction comprising:

an operation code field at least partially defining an operation, the operation requiring an operand; and a field in the expandably wide instruction specifying an address of a block of data in the memory, the block of data in the memory including a descriptor field that specifies within that block, locations of both (i) function parameters to be used in further defining the operation on the operand, and (ii) an output location defining a location in the memory at which output results from the first operation are to be stored, wherein the function parameters are wider than the data path width and require a plurality of transfers to copy the function parameters from the memory to the processor, and the output results are wider than the data path width and require a plurality of transfers to be copied from the processor to the memory.

* * * * *